Feb. 1, 1966  R. W. COURSEY  3,232,454
HIGH OCCUPANCY RATE MECHANICAL PARKING SYSTEM
Filed July 11, 1963  9 Sheets-Sheet 1

R W COURSEY
INVENTOR
BY *Jerry J. Dunlap*
ATTORNEY

Feb. 1, 1966 R. W. COURSEY 3,232,454
HIGH OCCUPANCY RATE MECHANICAL PARKING SYSTEM
Filed July 11, 1963 9 Sheets-Sheet 2
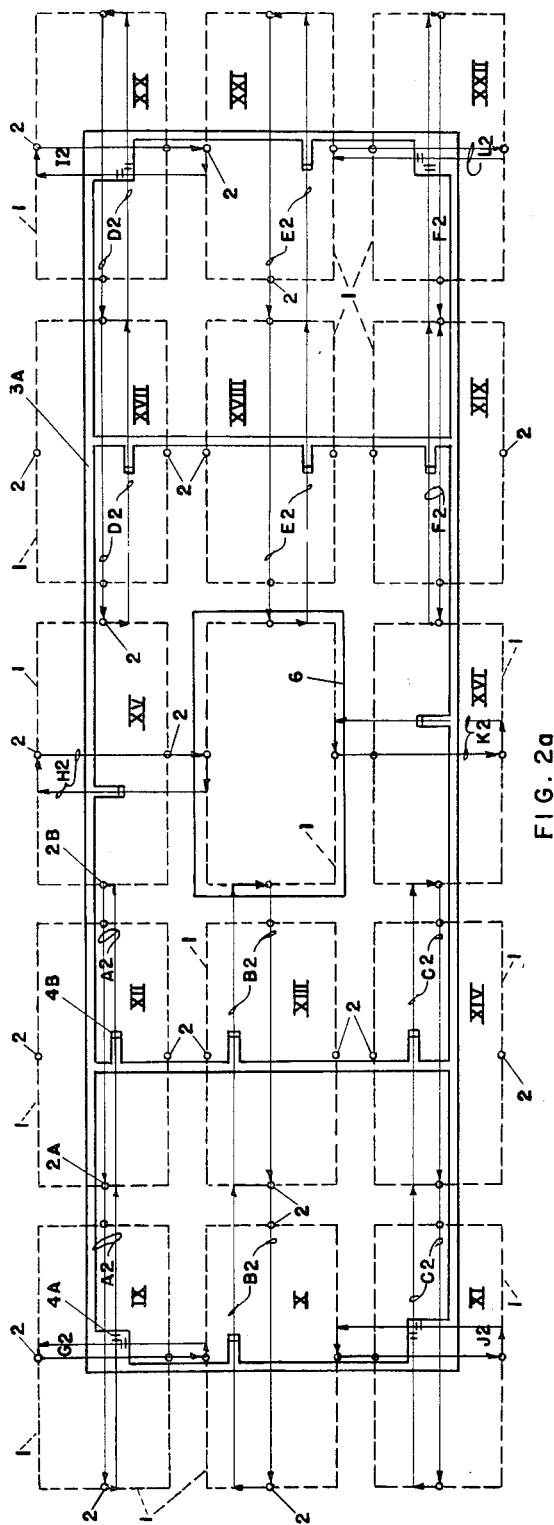
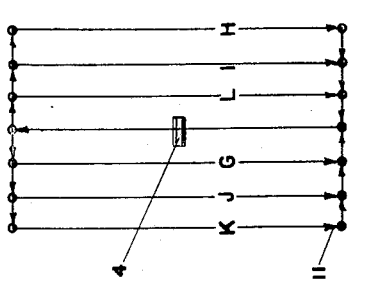
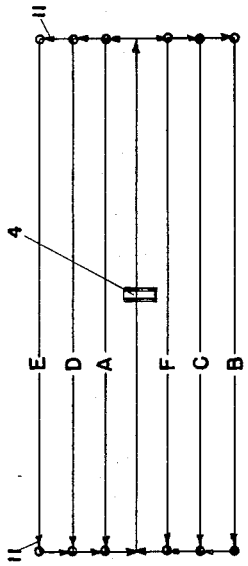
R W COURSEY
INVENTOR
BY *Jerry J. Dunlap*
ATTORNEY

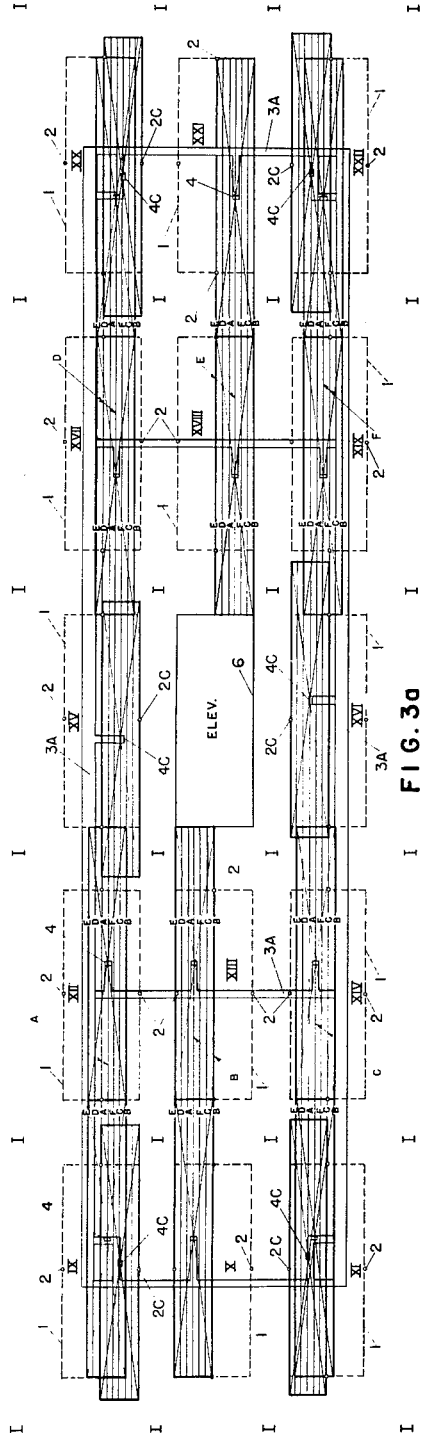
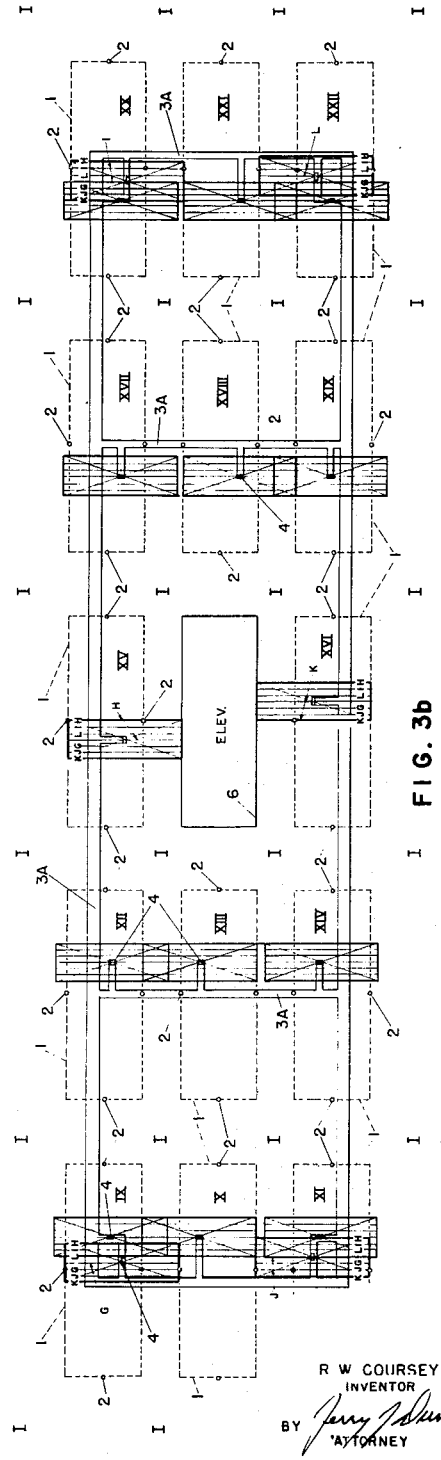

Feb. 1, 1966     R. W. COURSEY     3,232,454
HIGH OCCUPANCY RATE MECHANICAL PARKING SYSTEM
Filed July 11, 1963     9 Sheets-Sheet 4

R W COURSEY
INVENTOR
BY *Jerry J. Dunlap*
ATTORNEY

Feb. 1, 1966    R. W. COURSEY    3,232,454
HIGH OCCUPANCY RATE MECHANICAL PARKING SYSTEM
Filed July 11, 1963    9 Sheets-Sheet 5

R W COURSEY
INVENTOR
BY *Jerry J Dunlap*
ATTORNEY

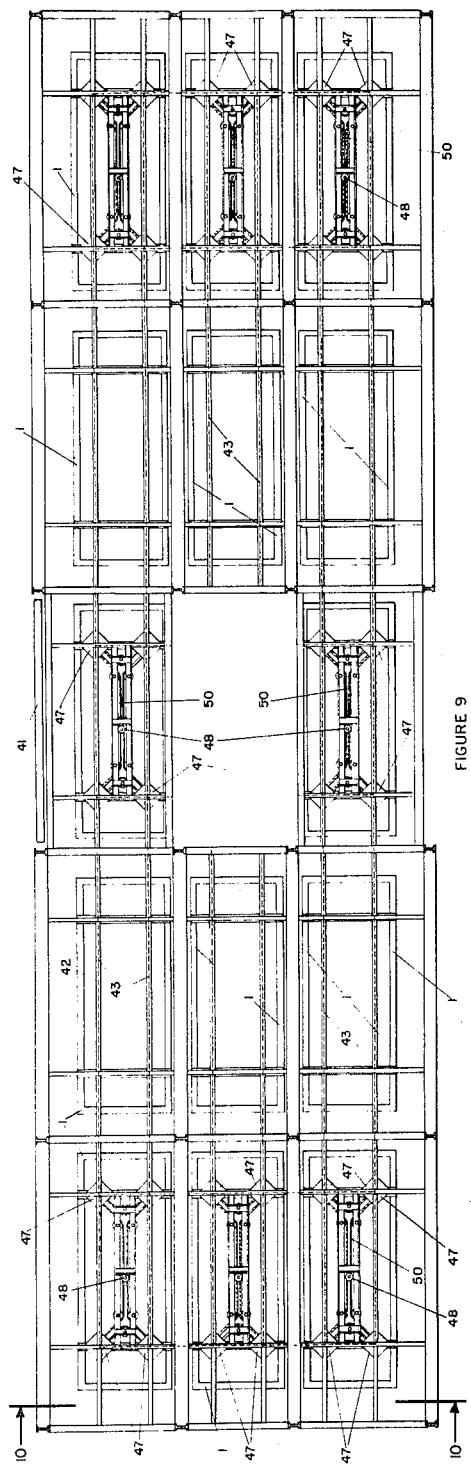
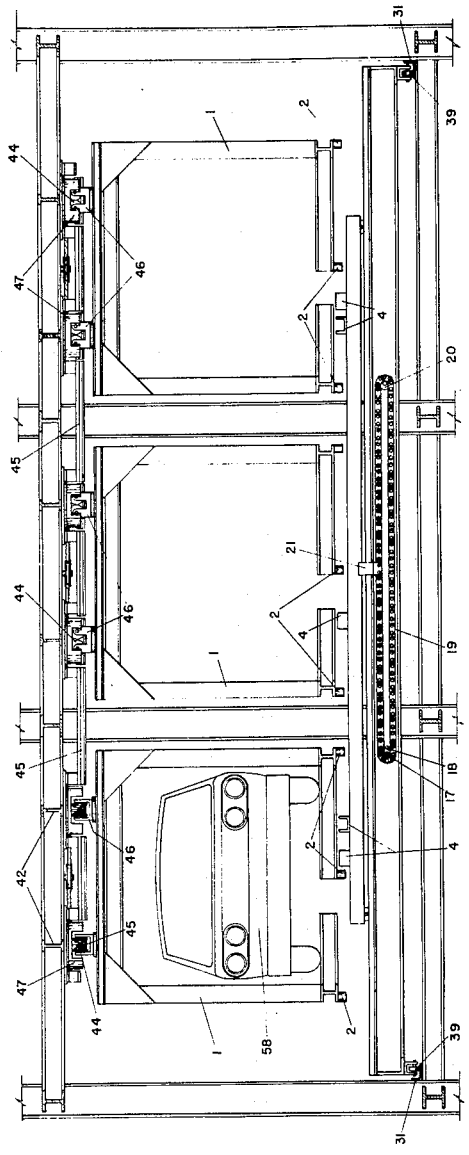
FIGURE 9
FIGURE 10

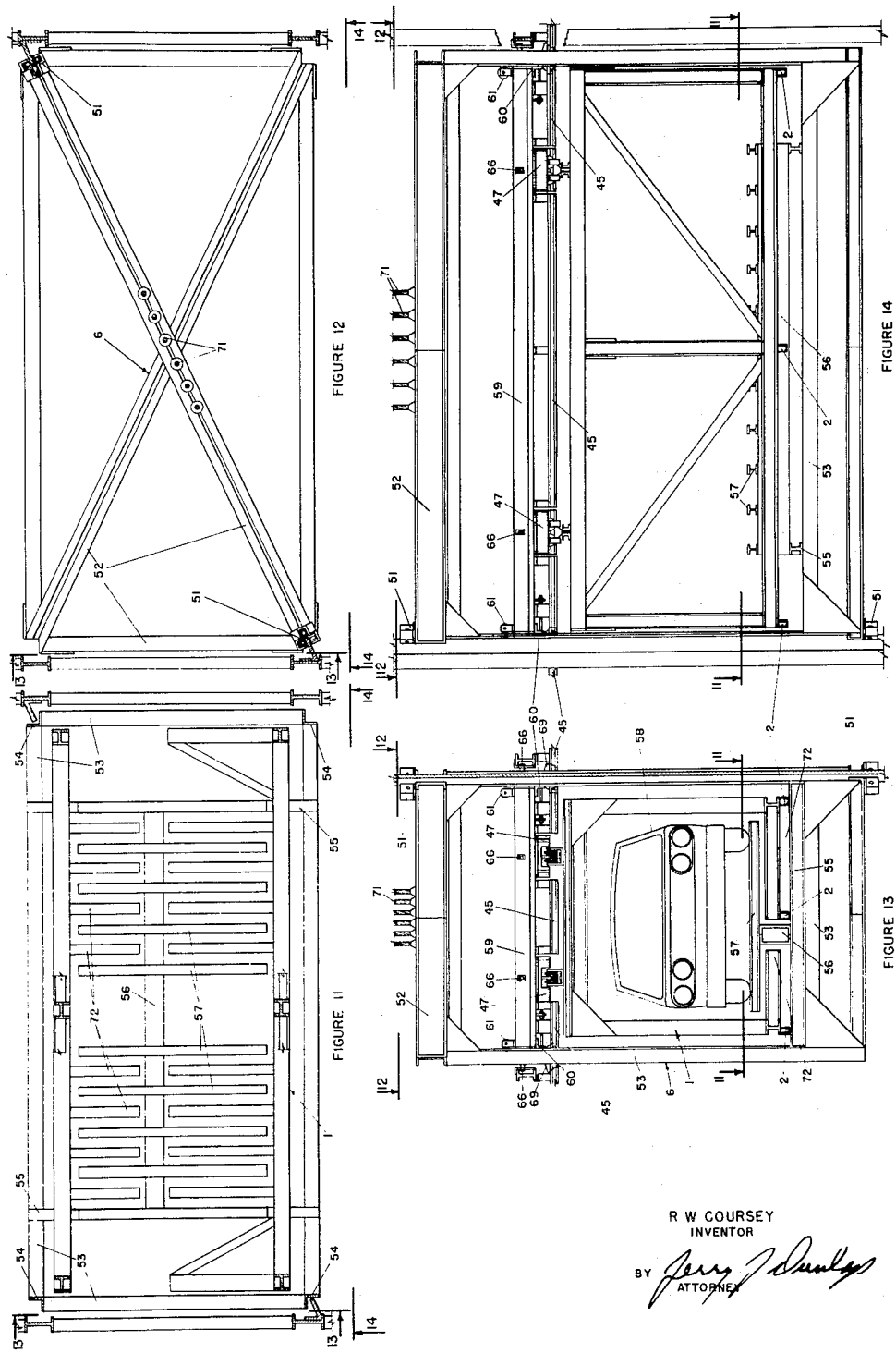

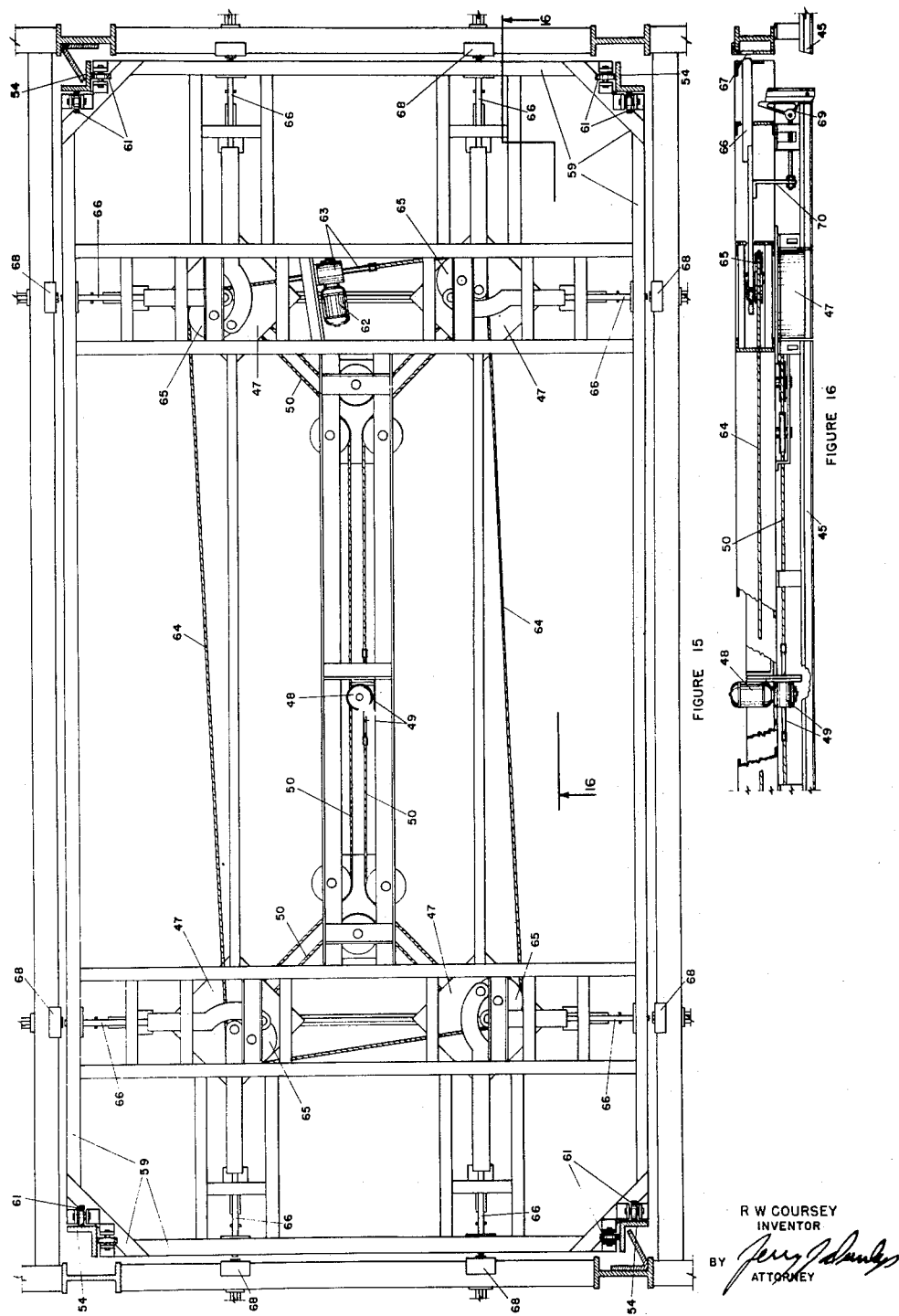

Feb. 1, 1966    R. W. COURSEY    3,232,454

HIGH OCCUPANCY RATE MECHANICAL PARKING SYSTEM

Filed July 11, 1963    9 Sheets-Sheet 9

R W COURSEY
INVENTOR
BY /s/ Jerry ... Dunlap
ATTORNEY

3,232,454
HIGH OCCUPANCY RATE MECHANICAL PARKING SYSTEM
Ralph W. Coursey, 1414 E. Wilshire, Oklahoma City, Okla.
Filed July 11, 1963, Ser. No. 294,330
6 Claims. (Cl. 214—16.1)

This invention in general relates to an improved method and system for storing articles and is particularly suited for mechanically parking automobiles at a high percent occupancy in a multilevel elevator type garage.

While there have been many inventions of mechanical systems patented, the only types in general use utilize approximately one-third or more of the total floor area for the elevator systems. This arrangement results in only 67 percent or less of the total floor area being usable for parking automobiles.

Systems presently in use store automobiles on only two sides of an elevator, hence the two-thirds occupancy. My system not only stores automobiles on four sides of an elevator but also in each corner to fill out a rectangular configuration. It will also selectively unpark them from this arrangement. Furthermore, my system will store and selectively unpark automobiles several cars deep; that is, one behind the other. It is a true mass parking system in that exclusive of the one-car space occupied by the elevator, the space occupancy is always 100 percent.

My system, depending upon the arrangement selected, will utilize from 83 to 96 percent of the total floor areas. This is from 60 to 110 more automobiles than can be parked by a 250 car garage of the same floor area of the type that is presently being operated.

The principle used in this invention is that the mass parking arrangement is broken or opened up by moving one car into the elevator, then by a system of movements, a number of cars are moved in one of several predetermined loop circuits until the car selected is in the elevator. To accomplish this, automobiles are stored in carriages, movable through individual cells, sometimes laterally, sometimes longitudinally, and sometimes either laterally or longitudinally.

Use is made of my Patent No. 3,054,518 entitled "System For Transferring Automobiles and the Like to and From Storage Carriages." With some improvements described and claimed in this application, carriages loaded or unloaded can, when the elevator is empty, be moved onto the elevator from any of four directions and also be moved off the elevator in any of four directions. When the elevator is occupied, empty carriages can be moved on or off the elevator in two directions. When the elevator is empty a loaded carriage can be moved onto the elevator in any one of four directions, the load transferred to the elevator and the empty carriage moved off the elevator in either of two directions. When the elevator is loaded, an empty carriage can be moved onto the elevator in either of two directions, the load transferred to the carriage which can then be moved off the elevator in any one of four directions.

Carriages are movably supported at four points from two tracks, insuring stability. When a carriage is at the proper location in cells designed for longitudinal and lateral entrance or exit, standard track turntables are provided in the tracks at the four carriage suspension points. These carriage suspension devices are rotatable to accommodate the rotational movement of the track turntables. The carriages can then be driven in the direction dictated by the position of the turntable.

The track and turntable arrangement in the cells is duplicated on the elevator. When the elevator is in proper position at a floor level its track support is locked in place and a movable section of each track drops into alignment with the cell tracks to complete the track network.

During some location in its travel each carriage must move (backward or forward) in one or other of two directions; one direction at 90 degrees to the other direction. Movement of a carriage is accomplished by applying effort to one of four pins extending below the carriage. A pin is located at the center of each side of each carriage. Engagement of the driving device is accomplished by a short U-shape channel member which slides over the pin then when properly positioned moves at 90 degrees to drive the carriage in the direction desired. A number of the U-shaped members are mounted on a platform that is movable forward or backward on another platform that is movable forward or backward at right angle to it. This latter platform moves on the building structure. The direction of carriage movement is determined therefore by which platform is moved.

The principal object of this invention is to provide a multilevel mechanical system for the parking, storing and selective unparking of automobiles in which various numbers of automobiles can be stored at each level, occupying 100 percent of the floor area excluding the space of a vertically operated only, one car elevator.

A further object of the invention is to provide a mass, multilevel, elevator type mechanical parking system, that can be automatized to conserve labor; is stable while in motion; is flexible in that various types can be assembled to obtain either a higher occupancy rate, configuration, or faster operation; can be combined with more units to permit more parking spaces or fit land configuration, and lends itself to desirable entrance and egress ground floor arrangement.

Another object of this invention is to provide a mass storage system which is simple in construction, may be economically manufactured and assembled, using a maximum number of components already on the market, and which will have a long service life.

A still further object of the invention is to provide a system adaptable to a great number of floor levels (for minimum land use) with little loss in floor area or operational efficiency.

Other objects and advantages of the invention will be evident from the following detailed description, when read in conjunction with the accompanying drawings which illustrate my invention.

In the drawings:

FIGURE 1 is a schematic drawing showing the relationship of the carriages, carriage drive means and elevator in an eight carriage arrangement. The (a) part indicates the various loop paths the drive frame takes and which loop drives which carriage. (b) indicates carriage movements necessary to Park a vehicle when an empty carriage is at various locations. (c) indicates carriage movements necessary to Unpark a vehicle from various locations.

FIGURE 2(a) is the same as 1(a) except that it is a fourteen carriage system. The longitudinal loops the frame travels are shown in 2(b) and the lateral loops in 2(c).

FIGURE 3(a) is the same as 2(a) except the movement of each drive member is shown when the frame travels all the longitudinal loops and FIGURE 3(b) when the frame travels all the lateral loops.

Figure 4:
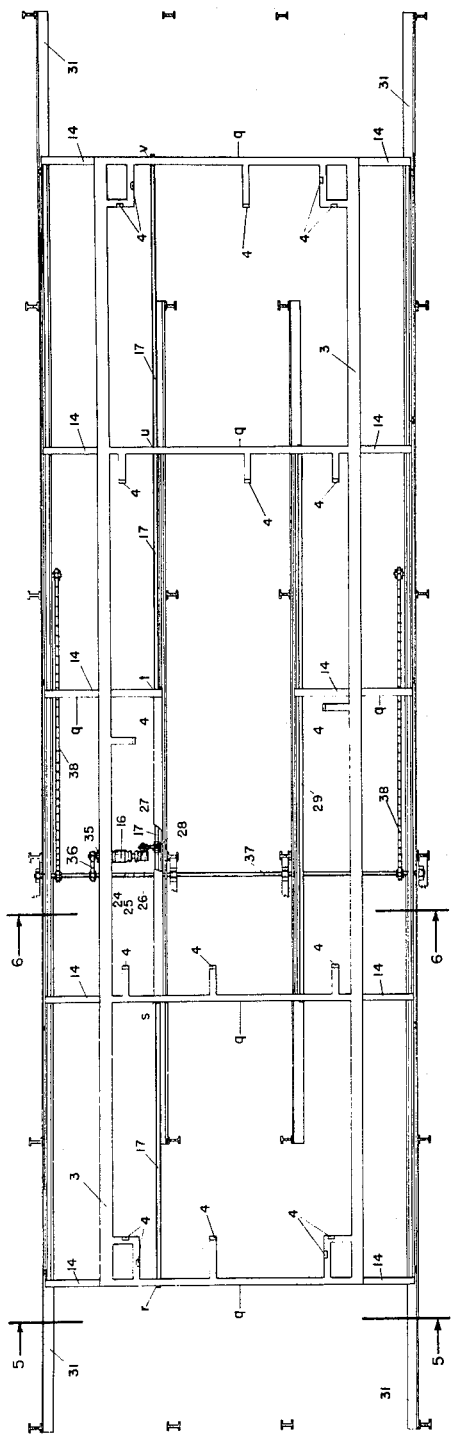
Figure 5:
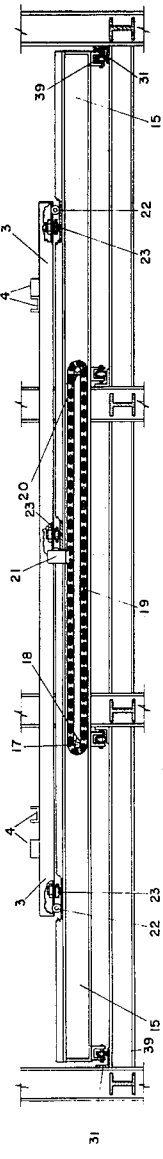
Figure 6:
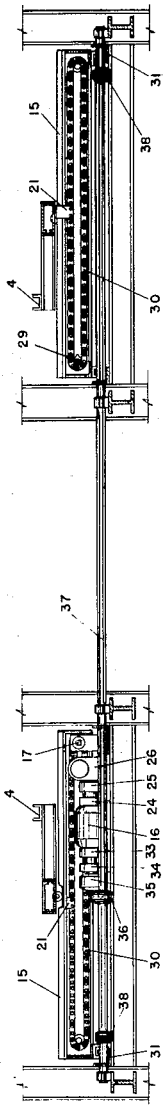

FIGURE 4 details the two-directional drive frames and FIGURES 5 and 6 are sectional views of it taken along lines 5—5 and 6—6.

Figure 7:
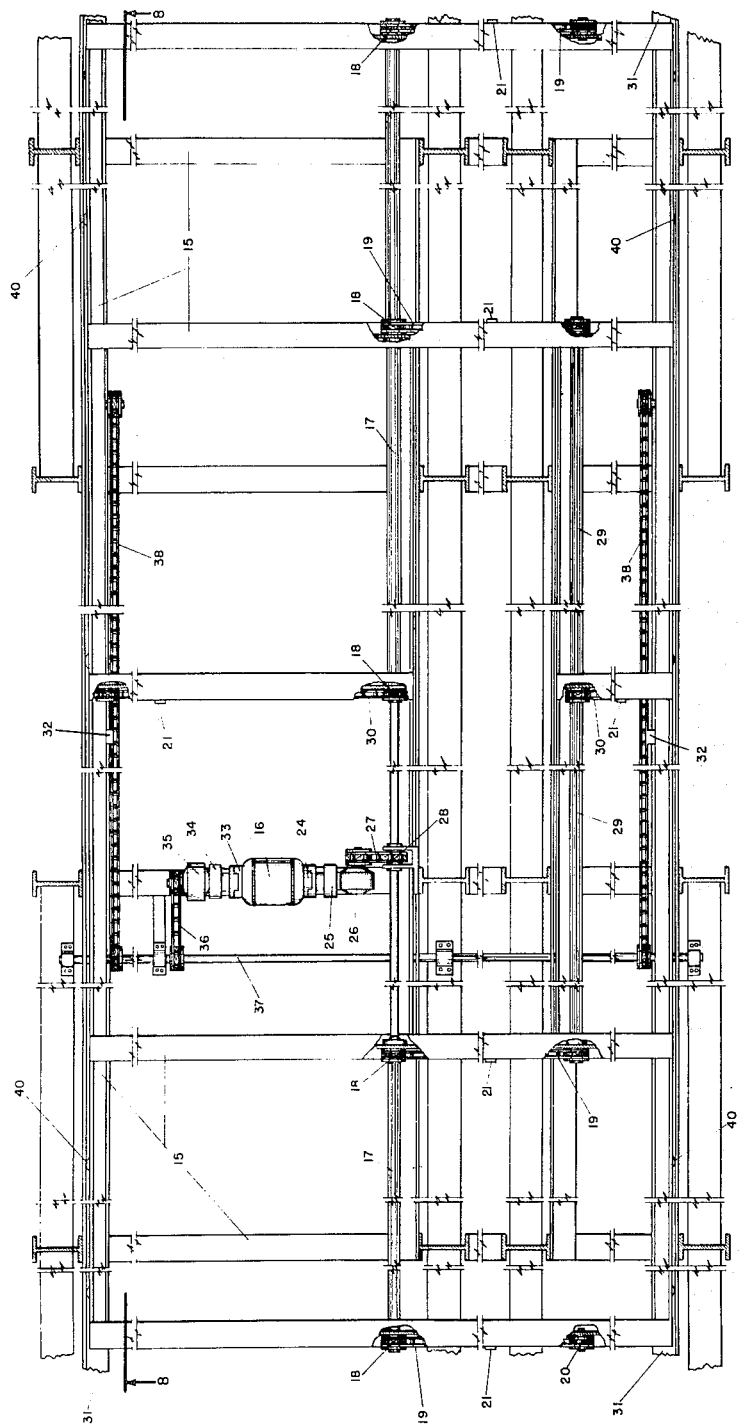
Figure 8:
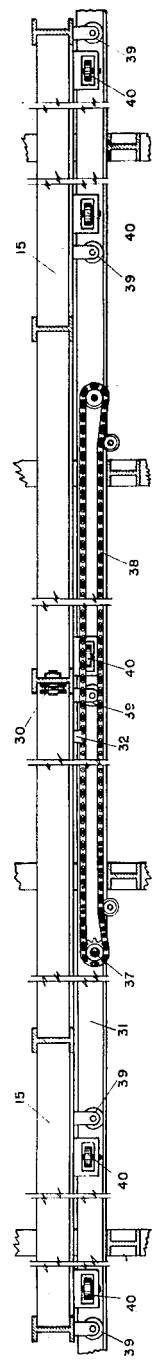

FIGURE 7 details the lower drive platform and FIGURE 8 is a sectional view of it, taken along line 8—8.

FIGURE 9 details the overhead track system that supports the carriages.

FIGURE 10 is a sectional view of FIGURE 9, taken along line 10—10.

FIGURE 11 and FIGURE 12 are two plan views of the elevator and FIGURES 13 and 14 are sectional views of it taken along lines 13—13 and 14—14.

FIGURE 15 is a detail of the elevator track system and FIGURE 16 is a sectional view of it taken along line 16—16.

Figure 17B:
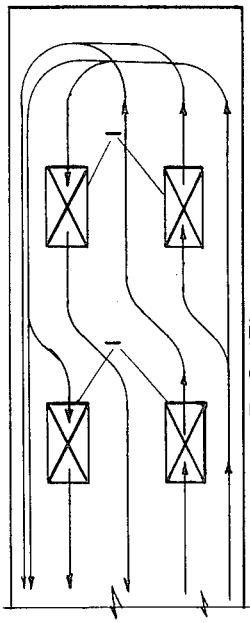
Figure 17A:
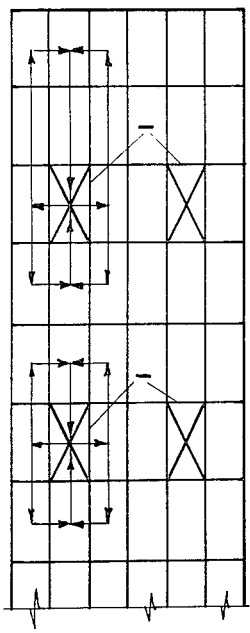

FIGURE 17(a) is a schematic plan of an upper floor of a typical parking garage with several units; two units each with one elevator serving eight park positions and two units each serving eleven positions, FIGURE 17(b) shows the ground floor arrangement of the garage.

Figure 18B:
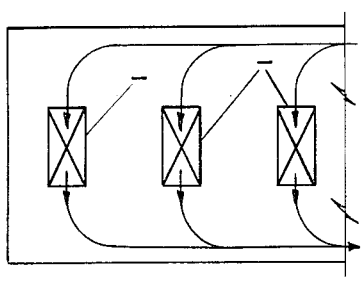
Figure 18A:
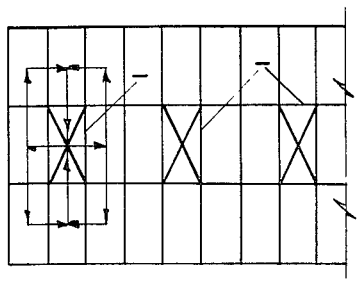

FIGURE 18(a) shows schematically another upper floor arrangement of elevator and park positions, and FIGURE 18(b) the respective ground floor arrangement.

Figure 19B:
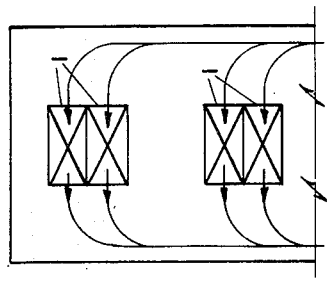
Figure 19A:
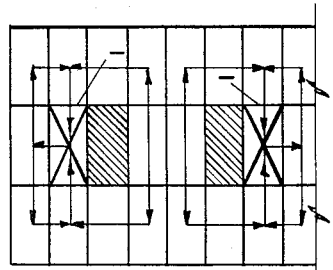

FIGURE 19(a) shows an upper floor arrangement of park positions relative to elevator position wherein each of two adjacent elevators serve alternate floors. This allows approximately double building height and half the ground area. FIGURE 19(b) shows a ground floor arrangement of this garage.

Figure 20B:
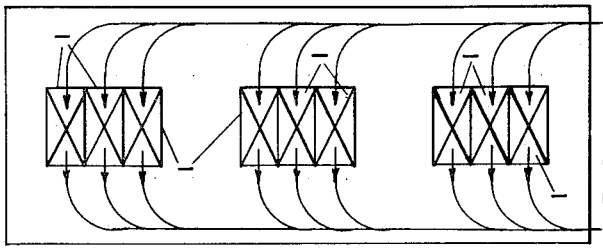
Figure 20A:
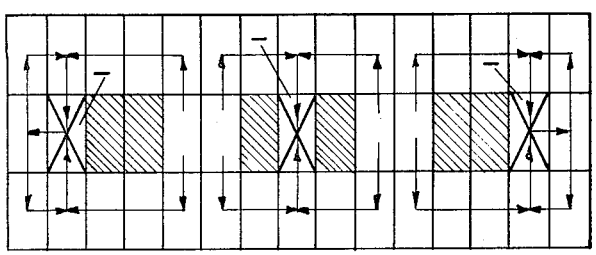

FIGURE 20(a) shows an upper floor arrangement wherein each elevator of three adjacent ones serves every third floor in staggered order. This system permits approximately triple building height and one-third ground area. FIGURE 20(b) shows the ground floor arrangement.

Systems of movement

Figure 1A:
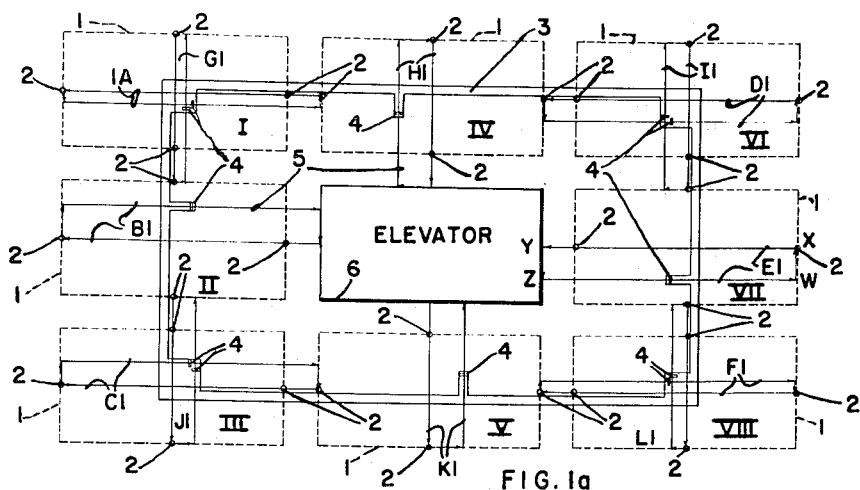
Figure 1B:
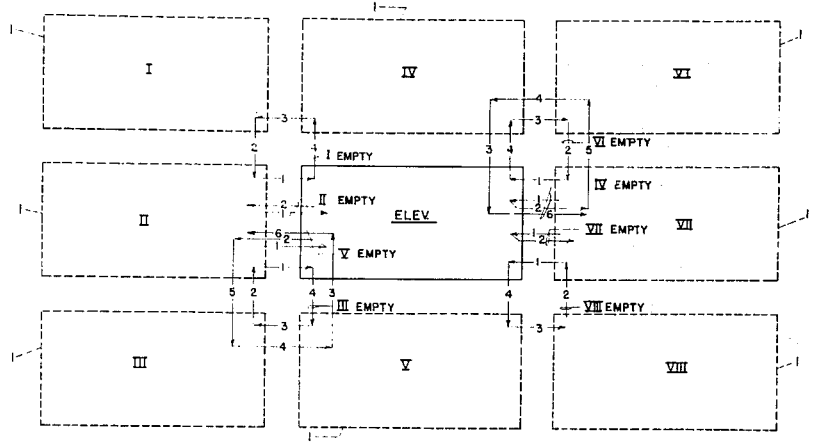
Figure 1C:
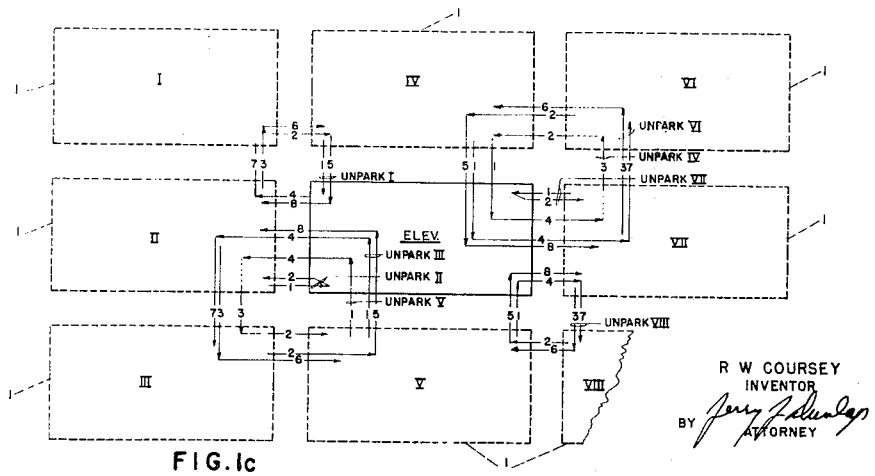

FIGURES 1(a), 1(b) and 1(c) illustrate a typical arrangement of carriages relative to the elevator position. FIGURE 1(b) shows the movements of carriages necessary in a *Parking* operation. It will be remembered and shown in detail later that when the elevator is loaded an empty carriage can enter the elevator only at either of the two ends (not from the sides). Therefore, after a *Parking* operation an empty carriage must always be in position II or VII in order that an empty carriage will be available for parking another vehicle. These two spaces can be occupied after all others are filled. A program of parking, therefore, requires that an empty be located and moved to one of these two positions.

In a *Parking* operation, the floor area must be scanned and the location of empty carriages determined, one selected that will require the least number of moves to position it at the VII or II location, then moves made in the direction of the arrows and in the order of the numerals. For example, suppose carriage in VI position was the selected empty. The empty in VII position would move onto the elevator, the vehicle would be transferred to it. The carriage in VI position (the selected empty) would move to VII position. The carriage in IV position would move to VI position and the loaded carriage would move off the elevator to position IV. The optimum selection of empty carriage for minimum movements and therefore minimum parking time is first the one in position VI then in position I, III, VIII, IV, V, II and VII, in that order.

Note that II is next to the last position occupied and VII is the last.

FIGURE 1(c) diagrams the movements for an *Unparking* operation. In this case an empty carriage does not have to be selected because the one from which the load is transferred to the elevator will be shoved into position II or VII. For example, suppose the one in position V is to be unparked. Loaded carriage in position V is first moved to the elevator, the load is transferred to the elevator, carriage in position III is moved to position V, II is moved to position III and the now empty carriage is moved from the elevator to position II. The routes shown by the arrows have been determined as the routes of minimum movements.

Drive system

FIGURE 1(a) illustrates in a general way how the carriages 1 are driven. Pins 2 extend downward from the center of the ends and the center of the sides of the carriages 1. Rectangular frame 3 encircles the elevator shaft way and simultaneously occupies each of the eight parking areas as shown in FIG. 1(a). Said frame 3 shifts carriages 1 longitudinally as result of longitudinal motion of the platform means 15 on which frame 3 is carried. The carriages 1 are shifted transversely by frame 3 as the latter moves transversely relative to and on platform means 15. Upwardly facing channel drive members 4 can be made to engage a pin 2 and move a specific carriage depending upon the dimensions of a loop 5 the frame 3 travels. For example, to move carriage in position VII to the elevator the frame 3 moves in loop E1. It first moves to the right to (w), then upward until upwardly facing channel member 4 engages pin 2 at (x), the frame 3 and drive member 4 then move to the left to (y), then downward to (z) disengaging pin 2 and back to the right to the starting position.

FIGURE 2(a) illustrates on a different arrangement of carriages how twelve loops A2, B2, C2, D2, E2, F2, G2, H2, I2, J2, K2 and L2 of frame-travel will result in movement in each of fourteen carriages 1. A carriage 1 is shown on the elevator 6 to illustrate the operation. There must be only thirteen in the cells under this condition. The direction of carriage movements depends on whether the travel is clockwise or counter-clockwise around the loop. Note that movement of the frame 3 around loops A2, B2, C2, D2, E2, and F2 drives two carriages simultaneously each time in this fourteen carriage arrangement. For example, in operating counter-clockwise around loop A2, drive members 4A and 4B at the upper left hand corner of the frame simultaneously engage pins 2A and 2B, respectively, driving carriages in positions XII and XV to the left. This particular movement will not be made except when carriage in position IX is out of its cell.

FIGURE 2(b) shows the movement of the drive members 4 in any *Longitudinal* loop with reference to the other loops. The normal position of a U-member 4 is as shown. The arrows 11 indicate only that these are travel paths. Actually in some operations the frame 3, and drive members 4 move around a loop clockwise and at other times counter-clockwise. FIGURE 2(c) shows the movements in any of the *Lateral* loops.

The detail drawings illustrate the fourteen carriage arrangement rather than the eight carriage shown in FIGURE 1 primarily to show its application to other arrangements with little modification. Although the space occupancy for the fourteen carriage system is 14/15 or 93.3 percent as compared to 8/9 or 88.9 percent for the eight carriage system, the eight carriage system will park and unpark in less moves and in other ways is more flexible. The fourteen (or more) carriage system is very applicable to warehousing and other storage facilities as well as automobile parking.

FIGURE 3 is a schematic drawing that shows all movements of the drive members 4. Since these members are the only part that extend above the plane of the frame 3, and the pins 2 are the only part that extends below the frame of the carriages 1, provision must be made to assure clearance between all pins 2 and all drive members 4 except the ones designed to engage upon the travel in a specific loop. The space relationship of the drive members 4 and the carriage pins 2 are clearly shown in FIGURE 10.

FIGURE 3(a) shows the path of travel of the center line of all the drive members 4 in all of the longitudinal loops A, B, C, D, E and F. FIGURE 3(b) shows the same thing in all of the lateral loops G, H, I, J. K and L.

These figures show no interference. In FIGURE 3(a) the path of the six lateral drive members specifically designated as 4C when moved in longitudinal loops do intersect the side pins specifically identified as 2C on carriages in positions IX, XV, XX, XI, XVI and XXII. However, these drive members 4C are U-shaped and the member 4C because of its shape permits the pin to pass through the U.

FIGURE 4 is a plan view in detail of the carriage driving mechanism. Frame platform 3 to which all of the drive members 4 are attached can be moved laterally on guide members 14 which are part of a platform 15 which is movable longitudinally. Motor 16 drives shaft 17, to be later described in more detail. Sprockets 18 (see FIG. 5) are mounted on shaft 17 at points (FIG. 4) $(r)$, $(s)$, $(t)$, $(u)$ and $(v)$ just below the top frame 3. The sprockets 18 at $(r)$ and $(s)$ drive chain 19 shown in FIGURE 5. Still referring to FIGURE 5, sprocket 20 is an idler sprocket. The chain 19 is connected at its midpoint to the top platform 3 with a clip angle 21. The same arrangement of driving the upper platform 3 (which rides on rollers 22 and is guided by rollers 23) from a clip angle 21 to a chain is applied at points $(q)$ in five more places. Two of these five connections are shown in FIGURE 6.

Referring to FIGURE 7 the driving mechanism is shown in greater detail. The upper platform is not shown. In this figure the upper laterally movable platform is driven at six clip angle attachments 21, by reversible motor 16 through electric clutch 24 and electric brake 25 (brake on when clutch is disengaged), gear reducer 26, chain 27, main shaft 17 (part of which is spline or rectangular and movable through sprocket 28), jack shaft 29 and chains 19 and 30. The provision for allowing slippage of shaft 17 through sprocket 28 permits the drive motor 16 to be mounted at a fixed position on the building structure.

Referring to FIGURE 7 the lower longitudinally movable platform 15 is driven at two clip angle chain attachments 32 (also see FIGURE 8), by reversible motor 16 through electric clutch 33 and electric brake 34, gear reducer 35, chain 36, lateral shaft 37 and chains 38.

The lower platform 15 rides on rollers 39 and is guided by rollers 40 cooperating with angle 31 as shown in FIGURE 8.

With this design, all critical parts of each frame are driven simultaneously at equal speed through a non-slippable chain arrangement, and the motor clutches and brakes being mounted on the building structure do not require extendable flexible electrical connections. The motor, brakes, clutches, shafts, rollers, chains, etc., are standard industrial equipment available on the present market.

*Track and carriage suspension system*

Referring to FIGURE 9, the view shown is a plan of the track system and supporting structure. It also shows the location of the elevator counter balance 41. The track system is supported from structure members 42 and their location actually below the supporting members 42 is shown in dash lines 43. Carriages 1 are suspended on rollers 44 from track 45 shown in FIGURE 10. The roller mounting 46 is caster mounted to the carriage, and can be rotated 90 degrees when centered in a track turntable 47 by operating the turntable. A track turntable 47 is provided at each intersection of the tracks 45. The turntable is operated by energizing the reversible motor 48. This is better shown on elevator drawing FIGURES 15 and 16. Motor 48 operates a mechanical jack type operator 49 (FIG. 15) to move the turntable cables 50. The turntable track can therefore be aligned while the carriage rollers 44 are in the turntable with either lateral or longitudinal track by operating motor 48. The caster mounted roller assembly 44 and 46 are of a type such as that manufactured by the Twin City Monorail Co. of Minneapolis, Minnesota as their No. T-165. The track turntables 47 are of a type such as that manufactured by the Twin City Monorail Co. as their No. TT-308.

In FIGURE 10 two track turntables 47 are shown aligned with lateral tracks and one with longitudinal tracks.

It is obvious that the turntables could be operated hydraulically instead of electrically.

*Elevator and carriage*

My Patent 3,054,518, granted September 18, 1962, describes a system that permits a carriage suspended from a track system to move into an elevator, and while in the elevator, transfer a vehicle to or from the carriage, then move the carriage from the elevator, loaded or empty as the case may be. That system is modified to make it accommodate the operation of the system described in this application. This system utilizes four supporting posts on both the elevator and carriages as compared with two on each in the original patent. The original concept employed horizontally extended fingers cantilevered from one side to support a vehicle. The carriage and the elevator each appeared in C configuration with the concave areas facing each other. With the track held stationary the fingers of the elevator could be lowered or raised between the fingers of the carriage to transfer the vehicle support. The carriage could then move off of the elevator.

The design of the carriage and elevator for this application can be described from FIGURES 11, 12, 13, 14, 15 and 16. First referring to FIGURE 12 it will be noted that the elevator roller guides 51 are shown on diagonal opposite corners of the elevator 6. The upper frame 52 is connected to and supports the lower frame 53 with four posts 54 as shown in FIGURE 11. Cross-members 55 support a longitudinal member 56. Fingers 57 are welded to the longitudinal member 56 to support vehicles 58 in the elevator.

A vertically movable platform 59 shown in FIGURES 13 and 14 to which the tracks 45 are attached, rests at the lower end of its travel on clips 60. This platform 59 is shown in plan view and in greater detail on FIGURE 15. It is guided in position by rollers 61 (FIG. 15) riding against posts 54. When the elevator arrives at the proper floor level, motor 62 drives the mechanical jack type operator 63 to move cable 64 turning pulleys 65 which operate to shoot latches 66 into slots 67 in the building structure members 68 as shown in FIGURE 16. At the same time latch 66 is being connected, track opener 69, through clip angle 70, closes the track opener 69 to form a continuous track between the elevator and building track 45. This operation could be performed by hydraulic means. Track opener 69 is of a type such as that manufactured by the Twin City Monorail Co. as their No. TO-1097.

Now referring back to FIGURE 13, lowering the elevator 6 with its cables 71 lowers fingers 57, but the track platform 59 being latched to the building structure does not lower and hence the tracks 45 and carriage 1 remain fixed and the elevator fingers 57 pass through the carriage fingers 72 depositing the vehicle 58 on the carriage fingers 72. The loaded carriage can now move off the elevator in any one of four directions depending upon the position of the track turntables 47.

It can now be seen that when the elevator is occupied the carriage can only move in and out in two directions, longitudinally, since the carriage fingers 72 must pass below the elevator fingers 57. However, when the elevator is unloaded, a carriage, loaded or unloaded can enter or leave in any one of four directions since its fingers 72 can travel above the elevator fingers 57.

*Application*

FIGURE 17($a$) illustrates how two, eight cell and two, eleven cell systems can be installed in combination to form a thirty-eight cell garage with four elevators. Circulation paths are shown by the arrows. The paths are as shown but the direction may be different from that shown by the arrows. The occupancy rate of this complex will be $38/42$ or 90.4%. Its maximum number of vehicles is approximately 400 since in any elevator system, one elevator should not handle over 100 cars. The maximum number of floors will therefore be 400/38 or 10.

FIGURE 17($b$) shows the simplicity of entering and leaving at the ground floor. Of course double end openings when obtainable would allow a very narrow combination, say three spaces wide.

FIGURE 18(a) shows a typical arrangement of a complex made up of eight cell units and its ground floor arrangement is shown in FIGURE 18(b). This complex has an occupancy rate of 88.9%, will handle any number of vehicles depending upon number of units, and will have a maximum height of approximately 12 levels.

FIGURE 19 and FIGURE 20 will allow more floor levels. In FIGURE 19(a) the cross-hatched elevator shaft opens at every other floor. The upper section shows the circulation from one elevator at its floors and the lower section shows the circulation about the other elevator at its alternate floors. This complex has an occupancy rate of $10/12$ or 83.3% and has a maximum height of 2(100/10) or 20 floors. FIGURE 19(b) shows the ground floor arrangement.

FIGURE 20(a) shows an arrangement where there are three elevators per unit each one opening every third floor. This complex has an occupancy rate of $12/15$ or 80%, and a maximum number of 3(100/12) or 25 floors. FIGURE 20(b) shows the ground floor arrangement.

I claim:

1. A system for temporarily storing articles, such as automobiles, at an elevated level, comprising:
    means forming an elevator shaft extending vertically through the elevated level;
    an elevator in the shaft having first and second ends and first and second sides;
    four groups of carriages for the articles to be stored, each carriage being of a size for movement into and out of the elevator and elevator shaft through either end and either side of the elevator;
    a carriage supporting track means in the elevator extending to both ends and both sides of the elevator;
    a first track system mating with the track means in the elevator and supporting a first group of carriages for movement in a rectangular pattern through the elevator via the first end and the first side of the elevator;
    a second track system mating with the track means in the elevator and supporting a second group of carriages for movement in a rectangular pattern through the elevator via the first end and the second side of the elevator;
    a third track system mating with the track means in the elevator and supporting a third group of carriages for movement in a rectangular pattern through the elevator via the second end and the first side of the elevator;
    a fourth track system mating with the track means in the elevator and supporting a fourth group of carriages for movement in a rectangular pattern through the elevator via the second end and second side of the elevator; and
    means for moving the groups of carriages along the respective track systems in any desired sequence.

2. A system as defined in claim 1 wherein each track system is an overhead system and the carriages are suspended from the respective track systems.

3. A system as defined in claim 2 wherein said means for moving the carriages along the track systems comprises frame means encircling the elevator shaft, and characterized further to include:
    cooperating lug means on the frame means and each carriage for selectively connecting the frame means to selected carriages; and
    means for moving the frame means in four directions for moving any one of the carriages along the respective track system into and through the elevator.

4. A system as defined in claim 3 wherein the frame means are positioned below the level of the carriages and comprise:
    a first frame supported for movement in a straight line in opposite directions; and
    a second frame carried by the first frame and supported for movement with the first frame and in opposite directions at right angles to the first frame.

5. A system as defined in claim 4 wherein said cooperating lug means comprises a plurality of pins extending downwardly from each carriage and upwardly facing channel members on the second frame positioned to move over cooperating pins in one direction of movement of the second frame and engage said cooperating pins upon movement of the second frame at right angles to said one direction.

6. A system as defined in claim 2 characterized further to include:
    locking means on the elevator track means for engaging at least two of said track systems to hold the elevator track means in a fixed vertical position during limited vertical movement of the elevator; and
    meshing fingers on the elevator and each carriage for transferring an article from a carriage to the elevator, and vice versa, upon vertical movement of the elevator when the respective carriage is supported by the elevator track means.

References Cited by the Examiner

UNITED STATES PATENTS

| Re. 18,493 | 6/1932 | Dinkelberg. | |
|---|---|---|---|
| 2,009,579 | 7/1935 | Ewend | 214—16.1 |
| 2,849,126 | 8/1958 | Kerekes | 214—16.1 |
| 2,916,168 | 12/1959 | Coursey | 214—16.1 |
| 3,054,518 | 9/1962 | Coursey | 214—16.1 |

FOREIGN PATENTS

| Ad. 74,243 | 11/1960 | France. |
|---|---|---|
| 533,703 | 9/1955 | Italy. |

HUGO O. SCHULZ, *Primary Examiner.*

GERALD M. FORLENZA, *Examiner.*